Patented Mar. 28, 1950

2,501,806

UNITED STATES PATENT OFFICE 2,501,806

RECOVERING FATTY ACIDS FROM A SLUDGE

Joshua Robert Akers, Glen Cove, N. Y., and Carl B. Hamlin, Holtwood, Pa.

No Drawing. Application June 8, 1948, Serial No. 31,836

3 Claims. (Cl. 260—419)

This invention relates to recovering a mixture of fatty acids, predominantly stearic acid, from a viscous or pasty residue remaining after recovery by distillation of the hydro-carbon-fatty acid solution used in the ball mill processing of metallic powders, a typical example being aluminum powder.

In processing aluminum powder, the fatty acids dissolved in hydrocarbons, such as naphtha, is used in the aluminum milling and desiccating operation. The aluminum powder is filtered from this fatty acid solution. The filtrate is a mixture of fatty acids, predominantly stearic acid dissolved in hydrocarbons contaminated by particles of metal including unremoved aluminum particles and, possible, metal particles released from the milling and desiccating tools, and also hydrocarbon impurities, and possibly other impurities. The hydrocarbons are recovered from this filtrate by distilling them off. This leaves a sludge consisting essentially of aluminum stearate. stearic and other fatty acids in varying amounts contaminated by metallic and non-metallic impurities picked up in the manufacturing process.

The objects of this invention include the provision of a method of converting the aluminum stearate in the sludge to stearic acid and recovering the fatty acids from this sludge substantially freed from the contaminating elements; and to provide a method of recovering the fatty acids from such sludge and which is simple and effective and may be practiced expeditiously and inexpensively.

In practicing this process, the sludge remaining after the hydrocarbons have been distilled off from the contaminated fatty-acid hydrocarbon solution is treated with an acid which converts the metallic particles in the sludge to water-soluble metallic salts. The acid may be organic or inorganic. For instance, acetic acid or hydrochloric acid may be used with sufficient water to form water solutions of all the water-soluble metallic salts and of other water-soluble constituents of the sludge. With these acids the water-soluble metallic salts would be either metal acetates or metal chlorides. Other acids which would serve to convert the metal particles to their metallic salts are well known. The sludge so treated is then filtered one or more times through a suitable filter, preferably by pressing, to expel the water solutions, solvents, mineral oils and other liquids, thus freeing the fatty acids therefrom. The filter, if desired, may be in the form of a canvas bag. It is found that the recovered fatty acids when dissolved in hydrocarbons for manufacturing purposes will compare favorably with the Standard "Triple Pressed" stearic acid-hydrocarbon mixture commonly used in the manufacture of metallic powders.

As an example:

| | Operation | Result |
|---|---|---|
| 1 | Heat batch of about 1250 lbs. sludge to melting. | |
| 2 | Add HCl (Tech) 15% by weight and agitate. | Splitting any aluminum stearate into stearic acid and aluminum chloride. |
| 3 | Wash thoroughly with hot water while in melted state and agitate. | Aluminum chloride brought into solution containing a stearic acid-oily solid which separates from the aqueous layer on cooling. |
| 4 | Allow to stand approximately 6 hours at room temperature to separate. | |
| 5 | Draw off liquid which separates on cooling. | |
| 6 | Transfer solid material to lined pressing cylinder provided with a filter screen. | |
| 7 | Place pressing cylinder in press under press ram. | |
| 8 | Apply pressure slowly until no flowing oils are observed. The pressure may be 20 lbs. per square inch. Hold at intermediate pressure for about 5 minutes. | Contaminated mineral spirits are freed from the stearic acid to get purer product. |
| 9 | Remove pressed cake to a wash tank. | |
| 10 | Wash (9) above with hot water for 20 minutes and cold water 10 minutes, agitate while washing. | Chlorides recovered from stearic acid. |
| 11 | Transfer washed material to pressing cylinder and press as in 8 above. | Free water and any oil not removed in first press is removed. |
| 12 | Heat to melting and draw off water not removed by pressing. | Entrapped water in stearic acid is removed. |

Optionally, after the step of treating the sludge with an acid to convert the aluminum stearate to its fatty acid and to form water-soluble salts of the metal content of the sludge, it may be further refined to produce a purer form of stearic acid by washing with any suitable solvent, for instance, ether, petroleum ether, alcohol or the like. However, a satisfactory product for manufacturing purposes may be obtained without employing this step. It is thus seen that the process either with or without this step is simple, inexpensive and yields a satisfactory product.

What we claim is:

1. A process of recovering stearic acid in purified condition from sludge containing stearic acid, aluminum stearate, aluminum particles and impurities, which consists in adding to the sludge hydrochloric acid and thereby converting the metal soaps to free fatty acids and aluminum chloride and converting the aluminum particles to aluminum salts, bringing said salts and including the aluminum chloride into solution by the addition of water, separating from the mixture a stearic acid-oily solid which separates from the said salt solution, and subjecting said solid to successive pressure-filter and washing action.

2. A process of recovering stearic acid in purified condition from sludge containing stearic acid, aluminum stearate, aluminum particles and impurities, which consists in adding to the sludge an acid of that class operable to convert metallic aluminum into water soluble metallic salts and thereby converting the metal soaps to free fatty acids and water soluble metal salts, bringing the soluble metal salts into solution by the addition of water under agitation, withdrawing the solution, and removing water-insoluble liquid impurities by pressure-filter action.

3. A process of recovering stearic acid in purified condition from sludge containing stearic acid, aluminum stearate, aluminum particles and impurities, which consists in adding to the sludge an acid which converts the metal soaps therein to free fatty acids and water soluble metal salts and converts metal particles therein to water soluble metal salts, bringing said salts into solution by the addition of water, separating from the mixture a stearic acid-oily solid which separates from the said salt solution, and subjecting said solid to successive pressure filter and washing action.

J. ROBERT AKERS.
CARL B. HAMLIN.

REFERENCES CITED

The following references are of record in the file of this patent:

UNITED STATES PATENTS

| Number | Name | Date |
|---|---|---|
| 2,171,200 | Urbain et al. | Aug. 29, 1939 |
| 2,334,258 | Gavin | Nov. 16, 1943 |
| 2,413,009 | Taussky | Dec. 24, 1946 |